(12) United States Patent
Peng et al.

(10) Patent No.: US 10,404,122 B2
(45) Date of Patent: Sep. 3, 2019

(54) SEGMENTAL STATOR, ELECTRIC MOTOR HAVING THE SAME, AND HOUSEHOLD APPLIANCE

(71) Applicants: GD MIDEA ENVIRONMENT APPLIANCES MFG CO., LTD., Zhongshan (CN); MIDEA GROUP CO., LTD., Foshan (CN)

(72) Inventors: Yingqing Peng, Zhongshan (CN); Zhanfei Han, Zhongshan (CN); Jianxiong Li, Zhongshan (CN); Zhigang Wang, Zhongshan (CN)

(73) Assignees: GD MIDEA ENVIRONMENT APPLIANCES MFG CO., LTD., Zhongshan (CN); MIDEA GROUP CO., LTD., Foshan (CN)

( * ) Notice: Subject to any disclaimer, the term of this patent is extended or adjusted under 35 U.S.C. 154(b) by 293 days.

(21) Appl. No.: 15/328,564

(22) PCT Filed: Jun. 25, 2015

(86) PCT No.: PCT/CN2015/082374
§ 371 (c)(1),
(2) Date: Jan. 24, 2017

(87) PCT Pub. No.: WO2016/015532
PCT Pub. Date: Feb. 4, 2016

(65) Prior Publication Data
US 2017/0207674 A1    Jul. 20, 2017

(30) Foreign Application Priority Data

Jul. 31, 2014  (CN) .......................... 2014 1 0374606
Jul. 31, 2014  (CN) ..................... 2014 2 0430471 U

(51) Int. Cl.
*H02K 3/28*    (2006.01)
*H02K 3/18*    (2006.01)
(Continued)

(52) U.S. Cl.
CPC ............... *H02K 3/28* (2013.01); *H02K 1/148* (2013.01); *H02K 3/18* (2013.01); *H02K 3/522* (2013.01);
(Continued)

(58) Field of Classification Search
CPC .... H02K 3/522; H02K 1/148; H02K 2203/03; H02K 2203/06
See application file for complete search history.

(56) References Cited

U.S. PATENT DOCUMENTS 7,560,839 B2 * 7/2009 Sumiya ................ F02M 37/048
                                                    310/43
2003/0218393 A1* 11/2003 Nishida .................. H02K 3/522
                                                    310/71
(Continued)

FOREIGN PATENT DOCUMENTS

CN           1319936 A       10/2001
CN          102522867         6/2012
(Continued)

OTHER PUBLICATIONS

EPO, Office Action for EP Application No. 15826537, dated Mar. 8, 2018.
(Continued)

*Primary Examiner* — Dang D Le
(74) *Attorney, Agent, or Firm* — Anova Law Group, PLLC

(57) ABSTRACT

A segmental stator, an electric motor have same and a household appliance are provided. The segmental stator includes: a plurality of main windings, a plurality of sec-
(Continued)

ondary windings, a plurality of winding needles and a wiring board. Each of the main winding and the secondary winding includes a core segment and a winding frame, and the winding frames of the main winding and secondary winding are wound with a main winding wire and a secondary winding wire respectively. The main windings include at least one first main winding separately wound with one main winding wire and at least two second main windings continuously wound with one main winding wire. The plurality of secondary windings include at least one or more of the following: at least one first secondary winding separately wound with one secondary winding wire and at least two second secondary windings continuously wound with one secondary winding wire.

20 Claims, 3 Drawing Sheets

(51) Int. Cl.
*H02K 1/14* (2006.01)
*H02K 3/52* (2006.01)
*H02K 17/06* (2006.01)
*H02K 17/08* (2006.01)

(52) U.S. Cl.
CPC ............ *H02K 17/06* (2013.01); *H02K 17/08* (2013.01); *H02K 2201/15* (2013.01); *H02K 2203/03* (2013.01); *H02K 2203/09* (2013.01)

(56) References Cited

U.S. PATENT DOCUMENTS

| | | | |
|---|---|---|---|
| 2013/0200742 A1* | 8/2013 | Seki | ................. H02K 3/28 310/195 |
| 2013/0257183 A1 | 10/2013 | Yokogawa | |

FOREIGN PATENT DOCUMENTS

| | | |
|---|---|---|
| CN | 102738939 A | 10/2012 |
| CN | 203180679 | 9/2013 |
| CN | 203554111 U | 4/2014 |
| CN | 203554112 | 4/2014 |
| CN | 203722351 | 7/2014 |
| CN | 204068450 | 12/2014 |
| EP | 2505844 | 10/2012 |
| JP | S353164971 | 12/1978 |
| JP | 2009017661 | 1/2009 |
| JP | 2013215023 | 10/2013 |

OTHER PUBLICATIONS

JPO, Office Action for JP Application No. 2017525664, dated Mar. 22, 2018.
SIPO, Office Action for CN Application No. 201410374606, dated Feb. 21, 2017.
ISA/CN, International Search Report for PCT/CN2015/082374, dated Sep. 22, 2015.

* cited by examiner

SEGMENTAL STATOR, ELECTRIC MOTOR HAVING THE SAME, AND HOUSEHOLD APPLIANCE

RELATED APPLICATIONS

This U.S. application is a National Phase entry under 35 U.S.C 371 of the International Patent Application No. PCT/CN2015/082374, filed Jun. 25, 2015, which claims the benefit of prior Chinese Application No. 201410374606.1 filed Jul. 31, 2014 and No. 201420430471.1 filed Jul. 31, 2014. The entire contents of the before-mentioned patent applications are incorporated by reference as part of the disclosure of this U.S. application.

FIELD

The present disclosure relates to a technical field of an electric motor for a household appliance, and more particularly to a segmental stator, an electric motor having the segmental stator, and a household appliance having the electric motor.

BACKGROUND

In a segmental electric motor, a main winding and a secondary winding are wound separately, and then the main winding and the secondary winding are connected together by means of a wiring board. A 4-pole electric motor generally has 12 wire outlet heads which are connected by means of a circular wiring board, such that many splices are resulted in and a probability of causing pseudo welding is increased, thus greatly affecting the welding quality. Meanwhile, the wiring board has a large area, which increases the cost, and furthermore, the large area thereof has a bad influence on flowing of air, which causes a temperature rise of the electric motor and affects a performance of the electric motor.

SUMMARY

Embodiments of the present disclosure seek to solve at least one of the problems existing in the related art to at least some extent. To this end, a first objective of the present disclosure is to provide a segmental stator, which reduces wire outlet points of windings and a possibility of pseudo welding.

A second objective of the present disclosure is to provide an electric motor having the above segmental stator.

A third objective of the present disclosure is to provide a household appliance having the above electric motor.

The segmental stator according to embodiments of a first aspect of the present disclosure, includes a plurality of main windings and a plurality of secondary windings, in which each of the main winding and the secondary winding includes a core segment and a winding frame disposed to the core segment, the core segments of the main windings and the core segments of the secondary windings are staggered and connected with one another in a circumferential direction to form an annular shape, the winding frame of the main winding and the winding frame of the secondary winding are wound with a main winding wire and a secondary winding wire respectively, in which the plurality of main windings include at least one first main winding and at least two second main windings, each first main winding is separately wound by means of one main winding wire, and the at least two second main windings are continuously wound by means of one main winding wire; the plurality of secondary windings include at least one first secondary winding and/or at least two second secondary windings, each first secondary winding is separately wound by means of one secondary winding wire, and the at least two second secondary windings are continuously wound by means of one secondary winding wire; a plurality of winding needles disposed on the winding frames respectively to lead out wire heads of corresponding main winding wires or secondary winding wires respectively; and a wiring board mounted to the plurality of main windings and the plurality of secondary windings that are connected in the annular shape, and an upper end of the winding needle passing through the wiring board.

In the segmental stator according to embodiments of the present disclosure, the secondary windings are continuously wound, at least one of the main windings is separately wound, and the rest of the main windings are continuously wound, such that less wire outlet points are formed, and less area of the wiring board is occupied, thus providing a simple structure and a low cost.

According to some embodiments of the present disclosure, four main windings are provided, and four secondary windings are provided.

According to some embodiments of the present disclosure, the main windings comprise one first main winding and rest of the main windings are the second main windings, and the secondary windings include one first secondary winding and rest of the secondary windings are the second secondary windings.

According to some embodiments of the present disclosure, the main windings include one first main winding and rest of the main windings are the second main windings, and the secondary windings only include a plurality of second secondary windings.

According to some embodiments of the present disclosure, the plurality of winding needles include two first winding needles disposed to the winding frame of the first main winding; two second winding needles respectively disposed to winding frames of two second main windings farthest away from each other among the second main windings; and two third winding needles respectively disposed to winding frames of two adjacent second secondary windings.

According to some embodiments of the present disclosure, each winding frame includes an upper frame comprising an upper outer arc plate and an upper inner arc plate, in which the upper inner arc plate is disposed at a radial inner side of the upper outer arc plate via a first connecting portion, winding posts are provided at two ends of a top of the upper inner arc plate, and tops of the upper outer arc plate and the upper inner arc plate of the upper frame are respectively provided with two hollow first patch posts spaced apart from each other; and a lower frame comprising a lower outer arc plate and a lower inner arc plate, in which the lower inner arc plate is disposed at a radial inner side of the lower outer arc plate via a second connecting portion, bottoms of the lower outer arc plate and the lower inner arc plate of the lower frame are provided with two hollow second patch posts spaced apart from each other; the upper frame is inserted into a top of the lower frame, and a corresponding core segment is fitted over a junction of the upper frame and the lower frame; the two first winding needles are respectively disposed in the first patch posts on the tops of the upper outer arc plate and the upper inner arc plate of the winding frame of the first main winding; the two second winding needles are respectively disposed in the first patch posts on tops of upper inner arc plates of winding frames of two second main windings farthest away from each other among the second main windings; the two third winding needles are respectively disposed in the second patch posts on bottoms of lower inner arc plates of lower frames of two adjacent secondary windings; after the secondary windings and the main windings are staggered and connected with one another, the first winding needles, the second winding needles and the third winding needles are located on the same plane and all connected to the wiring board.

Optionally, the upper outer arc plate is flush with the lower outer arc plate in an up-and-down direction, and the upper inner arc plate is flush with the lower inner arc plate in the up-and-down direction.

According to some embodiments of the present disclosure, two ends of each core segment is provided with a first positioning portion and a second positioning portion, in which the first positioning portion of one main winding and the second positioning portion of the secondary winding adjacent to a first side of the one main winding are mutually fitted and positioned, and the second positioning portion of the one main winding and the first positioning portion of the secondary winding adjacent to a second side of the one main winding are mutually fitted and positioned.

According to some embodiments of the present disclosure, the first winding needles, the second winding needles and the third winding needles are located within a range of 180 degrees of the wiring board in the circumferential direction.

According to some embodiments of the present disclosure, a top end of the core segment of the main winding is flush with a bottom end of the core segment of the secondary winding adjacent to the main winding.

According to some embodiments of the present disclosure, the wiring board is configured to have a semi-annular shape.

The segmental stator according to embodiments of the present disclosure reduces the wire outlet points of the windings, a possibility of pseudo welding and the cost, and also improves an area of heat dissipation of the electric motor to prevent a temperature rise.

The electric motor according to embodiments of a second aspect of the present disclosure, includes a rotor assembly having a rotor shaft and a rotor core disposed to the rotor shaft; and a segmental stator according to embodiments of the first aspect of the present disclosure, in which the segmental stator is fitted over the rotor assembly and the rotor assembly is rotatable relative to the segmental stator.

The electric motor according to the present disclosure, by adopting the segmental stator, improves the winding efficiency and the production efficiency, and may be operated reliably, such that the operation reliability of the electric motor is improved.

The household appliance according to embodiments of a third aspect of the present disclosure includes an electric motor according to embodiments of the second aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
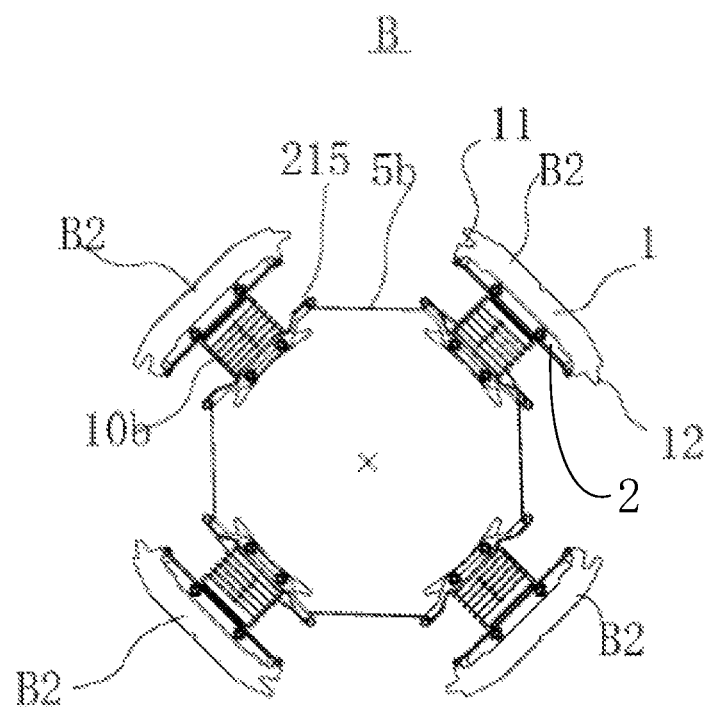
FIG. 1 is a schematic view of a wire connection of secondary windings of a segmental stator according to an embodiment of the present disclosure.

100: segmental stator; A: main winding; B: secondary winding;
1: core segment; 11: first positioning portion; 12: second positioning portion;
10a: main winding wire; 101a: main-winding-wire outlet head; 10b: secondary winding wire; 101b: secondary-winding-wire outlet head; 2: winding frame;
21: upper frame; 211: upper outer arc plate; 212: upper inner arc plate; 214: first patch post; 215: winding post;
22: lower frame; 221: lower outer arc plate; 222: lower inner arc plate; 224: second patch post;
3a: first winding needle; 3b: second winding needle; 3c: third winding needle;
4: wiring board;
5a: main cross-river wire; 5b: secondary cross-river wire.

DETAILED DESCRIPTION

Description will be made in detail to embodiments of the present disclosure, and examples of the embodiments will be illustrated in drawings. The same or similar elements and the elements having same or similar functions are denoted by like reference numerals throughout the descriptions. The embodiments described herein with reference to drawings are exemplary, illustrative, and used to generally understand the present disclosure. The embodiments shall not be construed to limit the present disclosure.

In the specification of the present disclosure, it should be understood that the terms such as "center", "longitudinal", "transversal", "upper", "lower", "front", "rear", "left", "right", "vertical", "horizontal", "top", "bottom", "inner", "outer", etc. should be construed to refer to the orientation as then described or as shown in the drawings under discussion. These relative terms are for convenience and simplifying of description, and do not alone indicate or imply that the device or element referred to must have a particular orientation, or be constructed or operated in a particular orientation. Therefore, these relative terms should not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

Hereinafter, a segmental stator according to embodiments of a first aspect of the present disclosure with reference to FIG. 1 will be described below. For example, the segmental stator may be used in a single-phase capacitor asynchronous motor.

The segmental stator 100 according to embodiments of the present disclosure includes a plurality of main windings A, a plurality of secondary windings B, a plurality of winding needles and a wiring board 4. As shown in FIGS. 1 to 4, each of the main winding A and the secondary winding B includes a core segment 1 and a winding frame 2 disposed to the core segment 1, and the core segments 1 of the main windings A and the core segments 1 of the secondary windings B are staggered and connected with one another in a circumferential direction to form an annular shape, such that the plurality of core segments 1 are spliced into a complete stator core.

Figure 3:
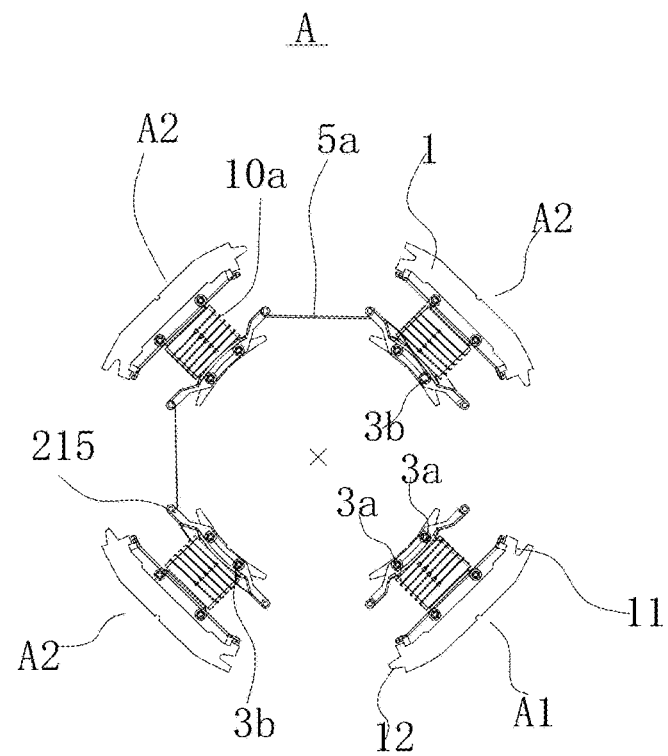
FIG. 3 is a schematic view of a wire connection of main windings of a segmental stator according to an embodiment of the present disclosure.
Figure 4:
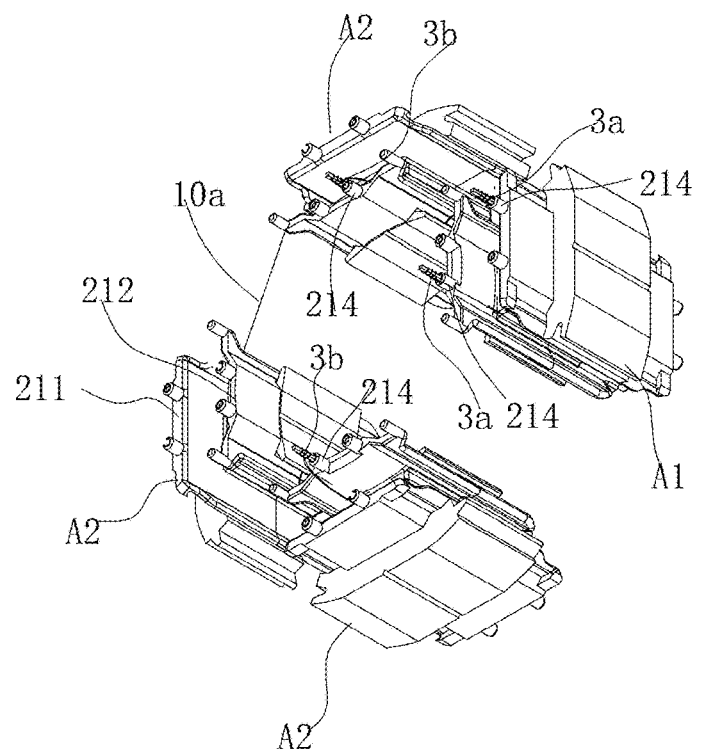
FIG. 4 is a perspective view of the main winding shown in FIG. 3.

The winding frame 2 of the main winding A is wound with a main winding wire 10a, and the main windings A include at least one first main winding A1 and at least two second main windings A2, in which each first main winding A1 is separately wound by means of one main winding wire 10a, and the at least two second main windings A2 are continuously wound by means of one main winding wire 10a sequentially, as shown in FIGS. 3 and 4. The winding frame 2 of the secondary winding B is wound with a secondary winding wire 10b, and the secondary windings B include at least one first secondary winding (not illustrated) and/or at least two second secondary windings B2. Each first secondary winding is separately wound by means of one secondary winding wire 10b, and the at least two second secondary windings B2 are continuously wound by means of one secondary winding wire 10b sequentially.

A top end of the core segment 1 of the main winding A is flush with a bottom end of the core segment 1 of the secondary winding B adjacent to the main winding A.

The winding frames 2 of the plurality of main windings A and the winding frames 2 of the plurality of secondary windings B are staggered with one another in the circumferential direction, such that the secondary windings B and the main windings A are staggered and connected with one another to form the annular shape, and a top surface of each main winding frame 11a and a bottom surface of a secondary winding frame 11b adjacent to the main winding frame 11a lie in the same plane.

The plurality of winding needles are disposed on the winding frames 2 to lead out wire heads of the corresponding main winding wires 10a or secondary winding wires 10b respectively, the wiring board 4 is mounted to the plurality of main windings A and the plurality of secondary windings B that are connected in the annular shape, and an upper end of the winding needle passes through the wiring board 4.

In the segmental stator 100 according to embodiments of the present disclosure, the secondary windings are continuously wound, at least one of the main windings is separately wound, and the rest of the main windings are continuously wound, such that less wire outlet points are formed, and less area of the wiring board is occupied, thus providing a simple structure and a low cost.

As shown in embodiments of FIGS. 1 to 5, four main windings A are provided, and four secondary windings B are provided. The four main windings A and the secondary windings B are staggered with one another. However, it should be noted that, in the description and FIGS. 1 to 5 of the present application, the four main windings A and the secondary windings B are shown for purpose of exemplary illustrations, but after reading the technical solution in the specification of the present application, it is obvious for those skilled in the art to understand that the solution may be applied to a technical solution with less or more main windings A and secondary windings B, which is also within the scope of the present disclosure.

In some embodiments, the main windings A include one first main winding A1 and the rest of the main windings A are the second main windings A2, and the secondary windings B include one first secondary winding and the rest of the secondary windings B are the second secondary windings B2 (not illustrated). Moreover, in other embodiments of the present disclosure, the main windings A include one first main winding A1 and the rest of the main windings A are the second main windings A2, and the secondary windings B only include a plurality of second secondary windings B2, but do not include the first secondary winding. In the example as shown in FIGS. 1 to 5, the main windings A include one first main winding A1 and three second main winding A2, in which the one first main winding A is separately wound and the three second main windings A2 are continuously wound sequentially, and the secondary windings B include four second secondary windings B2 wound continuously. Hereinafter, the segmental stator of the present disclosure will be described by taking this winding manner as an example.

Of course, the present disclosure is not limited to the two situations described above, and it should be understood by those skilled in the art that other similar winding situations, such as the permutation and combination of the winding situations described above of the main windings and secondary windings, etc., should fall in the scope of the present disclosure.

According to some embodiments of the present disclosure, the plurality of winding needles 3 include two first winding needles 3a, two second winding needles 3b and two third winding needles 3c. The first winding needle 3a is disposed to the winding frame 2 of the first main winding A1, the two second winding needles 3b are respectively disposed to winding frames 2 of two second main windings A2 farthest away from each other among the second main windings A2, and the two third winding needles 3c are respectively disposed to winding frames 2 of two second secondary windings B2 adjacent to each other.

Figure 2:
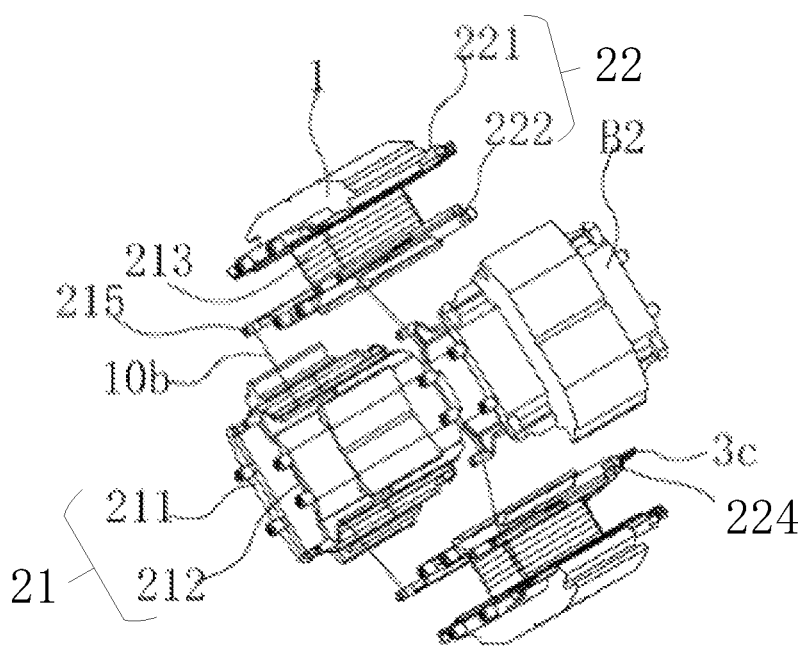
FIG. 2 is a perspective view of the secondary winding shown in FIG. 1.

In one specific embodiment of the present disclosure, as shown in FIGS. 2 and 4, each winding frame 2 includes an upper frame 21 and a lower frame 22. The upper frame 21 includes an upper outer arc plate 211 and an upper inner arc plate 212, and the upper inner arc plate 212 is disposed at a radially inner side of the upper outer arc plate 211 via a first connecting portion 213. In the description of the present disclosure, the radially "inner side" refers to an inward side in a radial direction of a connecting frame 3, and correspondingly, the radially "outer side" refers to an outward side in the radial direction of the connecting frame 3. Winding posts 215 are disposed at two ends of a top of the upper inner arc plate 212, thus facilitating a winding of a cross-river wire 5a among the plurality of second main windings A2 and a winding of a cross-river wire 5b among the second secondary windings B2. Tops of the upper outer arc plate 211 and the upper inner arc plate 212 of the upper frame 21 are respectively provided with two hollow first patch posts 214 spaced apart from each other.

The lower frame 22 includes a lower outer arc plate 221 and a lower inner arc plate 222. The lower inner arc plate 222 is disposed at a radially inner side of the lower outer arc plate 221 via a second connecting portion (not illustrated), and bottoms of the lower outer arc plate 221 and the lower inner arc plate 222 of the lower frame 22 are respectively provided with two hollow second patch posts 224 spaced apart from each other. The upper frame 21 is inserted into a top of the lower frame 22, and the corresponding core segment 1 is fitted over a junction of the upper frame 21 and the lower frame 22.

As shown in FIGS. 1 to 5, the two first winding needles 3a are respectively disposed in the first patch posts 214 on the tops of the upper outer arc plate 211 and the upper inner arc plate 212 of the winding frame 2 of the first main winding A1; the two second winding needles 3b are respectively disposed in the first patch posts 214 on tops of upper inner arc plates 212 of winding frames 2 of two second main windings A2 farthest away from each other among the second main windings A2; the two third winding needles 3c are respectively disposed in the second patch posts 224 on bottoms of lower inner arc plates 222 of lower frames 22 of two adjacent second secondary windings B2. In addition, after the secondary windings B and the main windings A are staggered and connected with one another, the first winding needles 3a, the second winding needles 3b and the third winding needles 3c are located in the same plane, and all connected to the wiring board 4.

That is to say, the first winding needle 3a and the second winding needle 3b of the main windings A are oriented in the same direction as the winding post 215 of the main windings A, while the third winding needle 3c of the secondary windings B is oriented in a direction opposite to the winding post 215 of the secondary windings B. In the segmental stator of the present disclosure, the winding frame 2 of the main winding A and the winding frame 2 of the secondary winding B are disposed in opposite directions. Since the third winding needle 3c of the secondary windings B and the winding post 215 of the secondary windings B are disposed at different sides, following advantages are provided: on one hand, it is convenient for a wiring of the wiring board 4, and on the other hand, as the secondary windings B are wound into a coil by a plurality of secondary winding wires, a plurality of over-bridge wires are provided among the secondary windings B, and thus a melted solder may be prevented from falling onto the over-bridge wires when welding a wire head to the third winding needle 3c, such that the plurality of over-bridge wires will not be connected together to cause a short circuit.

Preferably, as shown in FIGS. 1 to 5, the upper outer arc plate 211 is flush with the lower outer arc plate 221 in an up-and-down direction, and the upper inner arc plate 212 is flush with the lower inner arc plate 222 in the up-and-down direction. Thus, the structure is neat and the core segment 1 may be secured reliably.

According to some embodiments of the present disclosure, two ends of each core segment 1 are provided with a first positioning portion 11 and a second positioning portion 12 respectively. The first positioning portion 11 of one main winding and the second positioning portion 12 of the secondary winding adjacent to a first side of the main winding are mutually fitted and positioned, and the second positioning portion 12 of the main winding and the first positioning portion 11 of the secondary winding adjacent to a second side of the main winding are mutually fitted and positioned. Optionally, the first positioning portion 11 is configured to be a protrusion extending outwards from one end of the core segment 1, and the second positioning portion 12 is configured to be a recess recessed inwards from the other end of the core segment 1. Thus, the plurality of core segments 1 may have smooth transitions in the circumferential direction after being assembled, which facilitates mounting and disposition of other components.

Optionally, the first winding needles 3a, the second winding needles 3b and the third winding needles 3c are located within a range of 180 degrees of the wiring board 4 in the circumferential direction. Further optionally, the wiring board 4 is configured to have a semi-annular shape.

Hereinafter, a wire outlet way of the segmental stator according to some specific embodiments of the present disclosure will be described with reference to FIGS. 1 to 5.

Figure 5:
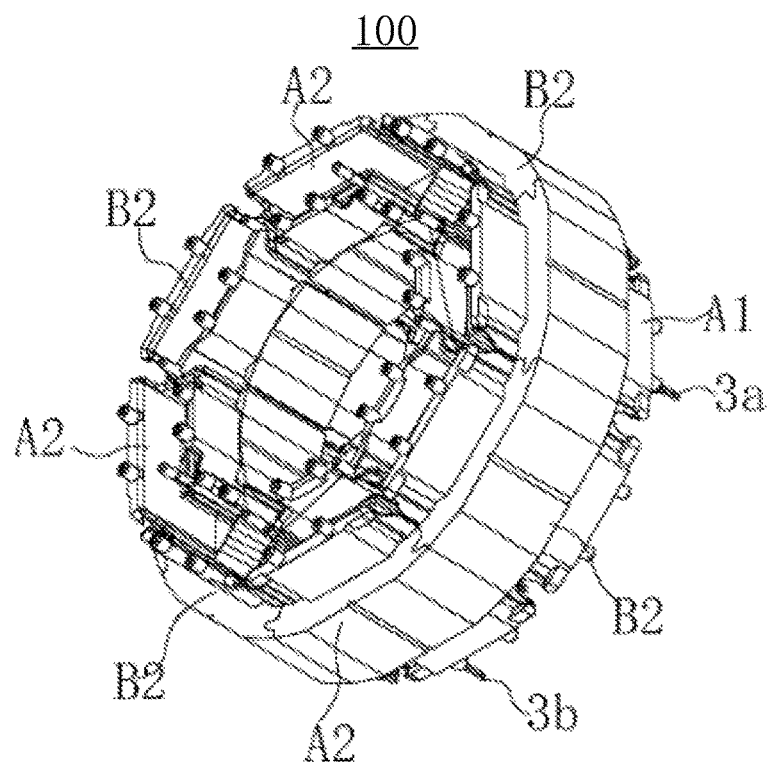
FIG. 5 is a perspective view of a segmental stator according to an embodiment of the present disclosure.
Figure 6:
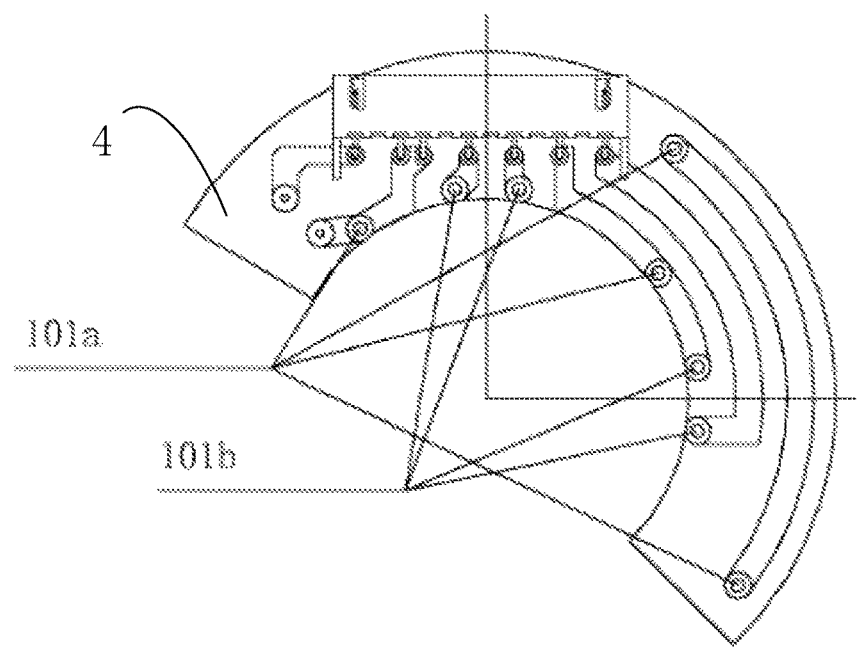
FIG. 6 is a schematic view of a wiring board of a segmental stator according to an embodiment of the present disclosure.

As shown in FIGS. 1 and 2, the secondary winding wire 10b of the plurality of secondary winding B2 is continuously wound by a winder (not illustrated), and the cross-river wire 5b between two adjacent second secondary windings B2 is hung on the winding posts 215. As shown in FIG. 6, a wire head and a wire tail are respectively wound on the third winding needles 3c located at a side opposite to the cross-river wire 5b, thus forming two wire outlet heads (there are four wire outlet heads for a three-speed motor, i.e. two taps plus a wire head and a wire tail, and there are two wire outlet heads for a single-speed motor). As shown in FIGS. 3 and 4, one first main winding A1 is separately wound to form two wire outlet heads, and three second main windings A2 are continuously wound to form two wire outlet heads, in which the cross-river wires 5a among the three second main windings A2 are hung on the winding posts 215, and a wire head and a wire tail of the main winding wire 10a are wound on the second winding needles 3b located at the same side as the cross-river wire 5a, i.e. the main windings A have a total of four wire outlet heads. As shown in FIG. 5, after the main windings A and the secondary windings B are inserted into each other face to face, and the wire outlet heads are weld in the same plane to form a complete stator, which then is connected to the semi-annular wiring board 4 to form a segmental stator assembly as shown in FIG. 6.

Thus, the segmental stator according to embodiments of the present disclosure reduces the wire outlet points of the windings, a possibility of pseudo welding and the cost, and also improves an area of heat dissipation of the electric motor to prevent a temperature rise.

An electric motor according to embodiments of a second aspect of the present disclosure includes a rotor assembly (not illustrated) and a segmental stator, in which the segmental stator is a segmental stator according to embodiments of the first aspect of the present disclosure. The rotor assembly includes a rotor shaft and a rotor core disposed to the rotor shaft. The segmental stator is fitted over the rotor assembly and the rotor assembly is rotatable relative to the segmental stator. Other configurations (such as the rotor core, the rotor shaft, etc.) and operations of the electric motor according to embodiments of the present disclosure are well known by those skilled in the art, which will not be described in detail herein.

The electric motor according to the present disclosure, by adopting the segmental stator of the above-described embodiments, improves the winding efficiency and the production efficiency, and may be operated reliably, such that the operation reliability of the electric motor is improved.

A household appliance according to embodiments of a third aspect of the present disclosure, for example a variable speed fan, etc., includes an electric motor according to embodiments of the second aspect of the present disclosure.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although exemplary embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A segmental stator, comprising:
a plurality of main windings and a plurality of secondary windings, wherein:
each of the main winding and the secondary winding comprises a core segment and a winding frame disposed to the core segment, and the core segments of the main windings and the core segments of the secondary windings are staggered and connected with one another in a circumferential direction to form an annular shape;
the plurality of main windings comprise:
a first main winding wound with a first main winding wire; and
at least two second main windings continuously wound with a second main winding wire separate from the first main winding wire;
the plurality of secondary windings comprise at least one of:
a first secondary winding wound with a first secondary winding wire; and
at least two second secondary windings continuously wound with a second secondary winding wire;
a plurality of winding needles disposed on the winding frames respectively to lead out wire heads of corresponding main winding wires or secondary winding wires respectively; and
a wiring board mounted to the plurality of main windings and the plurality of secondary windings that are connected in the annular shape, upper ends of the winding needles passing through the wiring board.

2. The segmental stator according to claim 1, wherein the plurality of main windings include four main windings, and the plurality of secondary windings include four secondary windings are provided.

3. The segmental stator according to claim 1, wherein the main windings comprise one first main winding and rest of the main windings are the second main windings, and the secondary windings comprise one first secondary winding and rest of the secondary windings are the second secondary windings.

4. The segmental stator according to claim 1, wherein the main windings comprise one first main winding and rest of the main windings are the second main windings, and the secondary windings only comprise the at least two second secondary windings.

5. The segmental stator according to claim 4, wherein the plurality of winding needles comprise:
two first winding needles disposed at the winding frame of the one first main winding;
two second winding needles respectively disposed at the winding frames of two of the second main windings farthest away from each other among the second main windings; and
two third winding needles respectively disposed at the winding frames of two adjacent ones of the second secondary windings.

6. The segmental stator according to claim 5,
wherein each winding frame comprises:
an upper frame comprising:
an upper outer arc plate;
an upper inner arc plate disposed at a radially inner side of the upper outer arc plate via a first connecting portion; and
winding posts provided at two ends of a top of the upper inner arc plate; and
wherein each of a top of the upper outer arc plate and the top of the upper inner arc plate is provided with two hollow first patch posts spaced apart from each other; and
a lower frame comprising:
a lower outer arc plate;
a lower inner arc plate disposed at a radially inner side of the lower outer arc plate via a second connecting portion
wherein each of a bottom of the lower outer arc plate and a bottom of the lower inner arc plate is provided with two hollow second patch posts spaced apart from each other;
wherein the upper frame is inserted in a top of the lower frame, and a corresponding core segment is fitted over a junction of the upper frame and the lower frame;
wherein:
the two first winding needles are respectively disposed in the first patch posts on the tops of the upper outer arc plate and the upper inner arc plate of the winding frame of the first main winding;
the two second winding needles are respectively disposed in the first patch posts on the tops of the upper inner arc plates of the winding frames of the two of the second main windings farthest away from each other among the second main windings; and
the two third winding needles are respectively disposed in the second patch posts on the bottoms of the lower inner arc plates of the winding frames of the two adjacent ones of the second secondary windings; and
wherein the first winding needles, the second winding needles, and the third winding needles are located on a same plane and all connected to the wiring board.

7. The segmental stator according to claim 6, wherein the upper outer arc plate is flush with the lower outer arc plate in an up-and-down direction, and the upper inner arc plate is flush with the lower inner arc plate in the up-and-down direction.

8. The segmental stator according to claim 1, wherein:
two ends of each core segment is provided with a first positioning portion and a second positioning portion;

the first positioning portion of one main winding and the second positioning portion of one secondary winding adjacent to a first side of the one main winding are mutually fitted and positioned; and the second positioning portion of the one main winding and the first positioning portion of another secondary winding adjacent to a second side of the one main winding are mutually fitted and positioned.

9. The segmental stator according to claim 1, wherein the winding needles are located within a range of 180 degrees of the wiring board in the circumferential direction.

10. The segmental stator according to claim 1, wherein a top end of the core segment of one main winding is flush with a bottom end of the core segment of one secondary winding adjacent to the one main winding.

11. The segmental stator according to claim 1, wherein the wiring board has a semi-annular shape.

12. An electric motor, comprising:
a rotor assembly comprising a rotor shaft and a rotor core disposed at the rotor shaft; and
a segmental stator comprising:
a plurality of main windings and a plurality of secondary windings, wherein:
each of the main winding and the secondary winding comprises a core segment and a winding frame disposed to the core segment, and the core segments of the main windings and the core segments of the secondary windings are staggered and connected with one another in a circumferential direction to form an annular shape;
the plurality of main windings comprise:
a first main winding wound with a first main winding wire; and
at least two second main windings continuously wound with a second main winding wire separate from the first main winding wire;
the plurality of secondary windings comprise at least one of:
a first secondary winding wound with a first secondary winding wire; and
at least two second secondary windings continuously wound with a second secondary winding wire;
a plurality of winding needles disposed on the winding frames respectively to lead out wire heads of corresponding main winding wires or secondary winding wires respectively; and
a wiring board mounted to the plurality of main windings and the plurality of secondary windings that are connected in the annular shape, upper ends of the winding needles passing through the wiring board;
wherein the segmental stator is fitted over the rotor assembly and the rotor assembly is rotatable relative to the segmental stator.

13. A household appliance, comprising an electric motor according to claim 12.

14. The electric motor according to claim 12, wherein the main windings comprise one first main winding and rest of the main windings are the second main windings, and the secondary windings only comprise the at least two second secondary windings.

15. The electric motor according to claim 14, wherein the plurality of winding needles comprise:
two first winding needles disposed at the winding frame of the first main winding;

two second winding needles respectively disposed at the winding frames of two second main windings farthest away from each other among the second main windings; and
two third winding needles respectively disposed at the winding frames of two adjacent second secondary windings.

16. The electric motor according to claim 15, wherein each winding frame comprises:
an upper frame comprising:
an upper outer arc plate;
an upper inner arc plate disposed at a radially inner side of the upper outer arc plate via a first connecting portion; and
winding posts provided at two ends of a top of the upper inner arc plate;
wherein each of a top of the upper outer arc plate and the top of the upper inner arc plate is provided with two hollow first patch posts spaced apart from each other; and
a lower frame comprising:
a lower outer arc plate;
a lower inner arc plate disposed at a radially inner side of the lower outer arc plate via a second connecting portion
wherein each of a bottom of the lower outer arc plate and a bottom of the lower inner arc plate is provided with two hollow second patch posts spaced apart from each other;
wherein the upper frame is inserted in a top of the lower frame, and a corresponding core segment is fitted over a junction of the upper frame and the lower frame;
wherein:
the two first winding needles are respectively disposed in the first patch posts on the tops of the upper outer arc plate and the upper inner arc plate of the winding frame of the first main winding;
the two second winding needles are respectively disposed in the first patch posts on the tops of the upper inner arc plates of the winding frames of the two of the second main windings farthest away from each other among the second main windings; and
the two third winding needles are respectively disposed in the second patch posts on the bottoms of the lower inner arc plates of the winding frames of the two adjacent ones of the second secondary windings; and
wherein the first winding needles, the second winding needles, and the third winding needles are located on a same plane and all connected to the wiring board.

17. The electric motor according to claim 16, wherein the upper outer arc plate is flush with the lower outer arc plate in an up-and-down direction, and the upper inner arc plate is flush with the lower inner arc plate in the up-and-down direction.

18. The electric motor according to claim 12, wherein:
two ends of each core segment is provided with a first positioning portion and a second positioning portion;
the first positioning portion of one main winding and the second positioning portion of one secondary winding adjacent to a first side of the one main winding are mutually fitted and positioned; and
the second positioning portion of the one main winding and the first positioning portion of another secondary winding adjacent to a second side of the one main winding are mutually fitted and positioned.

19. The electric motor according to claim 12, wherein the winding needles are located within a range of 180 degrees of the wiring board in the circumferential direction.

20. The electric motor according to claim 12, wherein a top end of the core segment of one main winding is flush with a bottom end of the core segment of one secondary winding adjacent to the one main winding.

* * * * *